United States Patent [19]

Luchinger

[11] Patent Number: 4,766,965
[45] Date of Patent: Aug. 30, 1988

[54] APPARATUS FOR DEPOSITING AND LIFTING OFF OF A REFERENCE WEIGHT IN AN ELECTRONIC SCALE

[75] Inventor: Paul Luchinger, Uster, Switzerland

[73] Assignee: Mettler Instrumente AG, Switzerland

[21] Appl. No.: 122,960

[22] Filed: Nov. 19, 1987

[30] Foreign Application Priority Data

Dec. 16, 1986 [CH] Switzerland ................... 5000/86

[51] Int. Cl.⁴ ............... G01G 19/52; G01G 19/00; G01G 1/02; G01L 25/00
[52] U.S. Cl. .................................. 177/50; 177/145; 177/191; 73/1 B
[58] Field of Search ............. 177/50, 145, 191; 73/1 B

[56] References Cited

U.S. PATENT DOCUMENTS 3,547,213 12/1970 Knothe et al. ............... 177/191 X
4,156,361 5/1979 Melcher et al. .
4,425,975 1/1984 Luchinger ..................... 177/50
4,566,548 1/1986 Sodler et al. .
4,611,676 9/1986 Meiring ........................ 177/50

FOREIGN PATENT DOCUMENTS 0044707 1/1982 European Pat. Off. .
650337 7/1985 Switzerland .

Primary Examiner—George H. Miller, Jr.
Attorney, Agent, or Firm—Pennie & Edmonds

[57] ABSTRACT

An apparatus for depositing of reference weights in an electronic scale consisting of two levers swivelable around vertical axes, one end of each lever is always in contact with a cam disc attached on a vertically disposed shaft and the other end of which is developed as a gliding shoe which may be pushed below the lifting tray. By rotating the cam shaft, the lifting trays cause the reference weights to be deposited by the cam discs at first each individually one after the other and then jointly onto the carriers.

10 Claims, 2 Drawing Sheets

APPARATUS FOR DEPOSITING AND LIFTING OFF OF A REFERENCE WEIGHT IN AN ELECTRONIC SCALE

BACKGROUND OF THE INVENTION

The invention relates to reference weights for electronic scales and more particularly to apparatus for depositing and lifting a reference weight in an electronic scale with a drivable cam disc and a lever operable by said cam disc.

The sensitivity of precise scales is customarily checked from time to time by using a reference weight which is deposited on a carrier built into the weighing mechanism below the pan of the scale. If necessary, a correcting factor is determined which may be used to properly adjust the scale.

In the U.S. Pat. No. 4,425,975 (Swiss patent No. 650,337) the depositing of a U-shaped reference weight is accomplished by pulling a wedge from under a spring sheet carrying the reference weight. As a result, the reference weight is lowered and placed onto the carrier of the scale pan. The wedge is shifted forward and backward with a lever operable from outside of the scale housing. The disadvantage of this apparatus is that it is not suitable for the selective use of more than one weight.

European patent application No. A1-0,044,707 shows an apparatus for the depositing of one or more reference weights. In this device the reference weights are suspended on swivelable levers. The levers are supported on cam discs which are attached on a horizontally lying shaft. The shaft may be put into motion by hand or by means of a motor.

The reference weights are disposed loosely suspended in the rest position, as well as during adjustment of the scale. Because the weights are loosely suspended, damage may occur as a result of impacts during transportation operation of the scale. In the case of scales with a and large measuring range (0.5 kg and more) it is not possible to accommodate a reference weight corresponding to the maximum load of the scale below the scale pan.

The object of the present invention is to provide an apparatus with which reference weights may be deposited individually or jointly, and in which the reference weights, whenever they are not needed, do not strain the operating mechanism.

SUMMARY OF THE INVENTION

This and other objects are achieved by providing cam discs with a vertical axis of rotation controlling the movement of the reference weights.

In a preferred embodiment, two levers as well as their corresponding cam discs may be disposed one above the other. As a result, a very low height of construction is achieved which makes it possible to locate the reference weights below the scale pan. The reference weights may have a weight adapted to the maximum load without thereby damaging the scale in the case of impacts. When the reference weights are not in use for determining a correction factor, they are firmly clamped against the cover of the scale by a wedge which rests on the bottom of the scale housing. The forces of the levers acting perpendicularly in relation to the rotational axis of the cam discs cause an automatic locking of the operating mechanism and of the reference weights whenever the latter are not needed for adjustment.

DETAILED DESCRIPTION OF THE INVENTION

Figure 1:
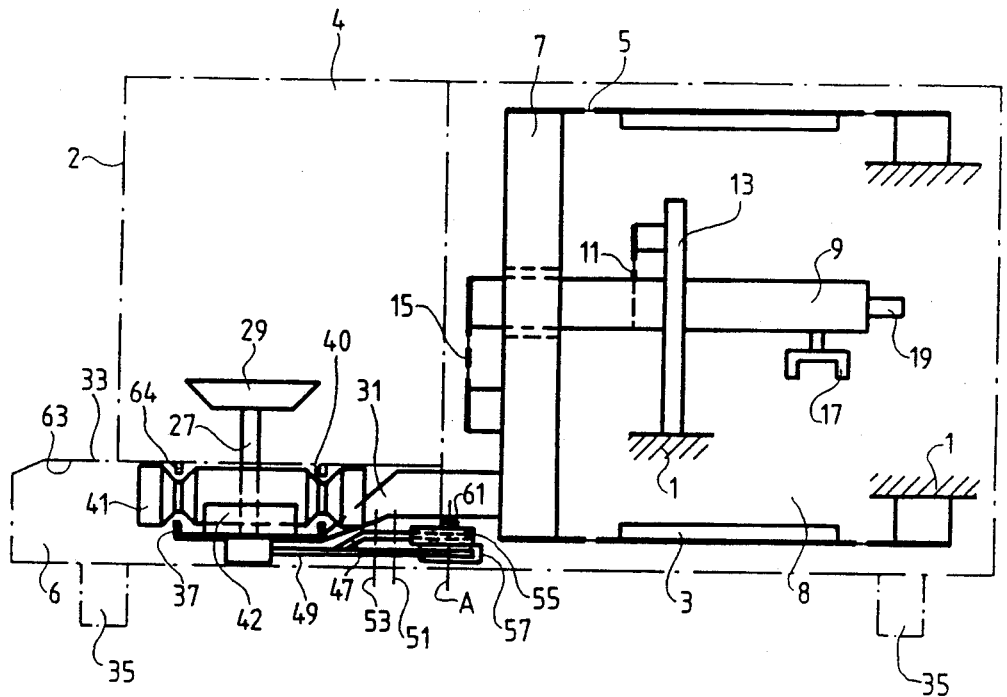
FIG. 1 shows a overall schematic presentation of an electronic scale utilizing the apparatus of the present invention.

A housing 2 indicated schematically by a dash-dot line encloses a weighing space 4, a lower front part 6 of the scale and a space 8 for the reception of a large part of the mechanics and electronics of the scale.

In the scale frame (all designated with 1) a receiver 7 for the load is guided by a connecting rod 3 and a bending bearing 5. A transmission lever or scale beam 9 is suspended via a bending bearing 11 swivelable on a panel 13. On one of its ends the transmission lever 9 is coupled to the receiver 7 of the load by way of a bending bearing 15. Close to its other end it has a submerging coil 17 which submerges into a locally fixed permanent magnet system of a known type (not shown). A flag 19 symbolizes the conventional scanning of the position (not shown) as is known in the art.

At the lower end of the receiver 7 a bracket is attached which forms a carrier 31 for the scale pan. The carrier 31 comprises two sheet metal strips 23 which are connected by a bar 25. In the center of bar 25 a peg 27 is mounted by threading peg 27 into a threaded opening in bar 25. The peg 27 receives the scale pan 29. The arrangement such that the scale pan 29 is located directly above the bottom 33 of weighing space 4, with the carrier 31 of the scale pan and the entire reference weight mechanism, described below, located directly below the bottom 33 of the weighing space 4. The scale housing 2 stands on feet 35. Below the scale pan 29, two reference weight carriers 37 are attached to the carrier 31 of the scale pan for the reception of two reference weights 39, 41 during the adjustment process. The reference weight carriers 37 are provided with two v-shaped notches 38 into which the weights 39, 41 are placed and held. Circumferential recesses 40 are made on the reference weights 39, 41 which lie in the notches 38 on the reference weight carriers 37 thus holding the reference weights from longitudinal movement during the adjustment process. The recesses 40 are dimensioned such that the reference weight carriers 37 project only slightly beyond the jacket of the reference weights 39, 41 when the reference weights 39, 41 are placed on them.

Moreover on the cover 63 of the weighing mechanism, below the bottom 33, strips 64 extending downwards may be attached which engage the recesses 40 to prevent the reference weights 39, 41 from lifting up. Below the reference weight carriers 37 lifting trays 43 are pivotably attached to the frame of the scale 1. The lifting trays 43 are swivelable on the lateral walls 21, with a guide surface 42 running inclined in relation to the horizontal line for lifting off and depositing of the weights 39, 41.

The lifting trays 43 may be made from a punched sheet metal part which has lateral recesses 44 with which the sheet metal part may be loosely suspended in a slot 46 in the lateral wall 21 to provide a hinged or pivotable connection.

Figure 2:
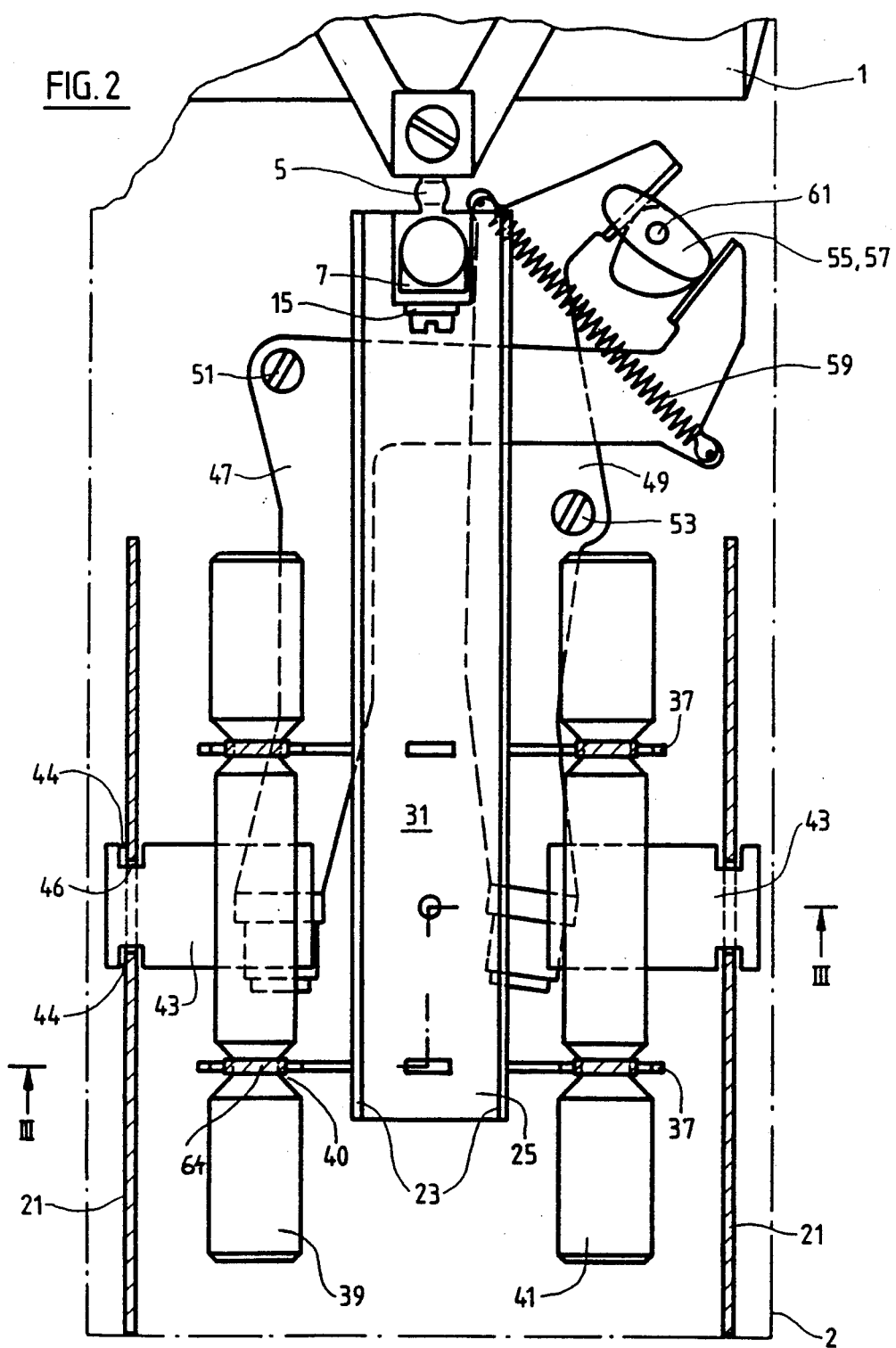
FIG. 2 shows a top view of the operating arrangement and the reference weights without the scale cover.

For the lifting of the lifting trays 43, levers 47, 9 are mounted to pivot about vertical axes 51, 53 and may be pivoted forward and backwards by means of cam discs 55, 57. To lift a lifting tray 43, the free end of a lever is swung under the lifting tray 43. A helical spring 59 holds the levers 47, 49 against the cam discs 55, 57. The two cam discs 55, 57 lie one on top of the other on a vertical shaft 61 drivable by a motor with position sensor (not shown). The two levers 47, 49 are disposed crossing each other, partly lying one above the other with each lever riding on an opposite side of the cam shaft (FIG. 2). Gliding shoes 45, which rest on the bottom of the scale frame 1, may be attached at the free ends of the two levers 47, 49 to facilitate movement underneath the lifting trays 43. The gliding shoes 45 consist preferably of a self-lubricating material such as nylon etc. or may be provided with a roller 48.

The cam discs 55, 57 are firmly connected with the cam shaft 61 and they have cam paths which are designed so that by rotating the cam shaft 61 to specified points the reference weights 39, 41 may be lowered each individually or together. The design is such that in the course of a 360° rotation of the shaft 61 each of the two cam discs 55, 57 swings the pertinent lever twice away from the lifting tray and pushes the lever twice underneath the lifting tray. The course of the curve on the cam discs depends on the lengths of the lever arms, their geometrical form as well as the shape of the lifting trays 43 and of the gliding shoes 45.

Figure 3:
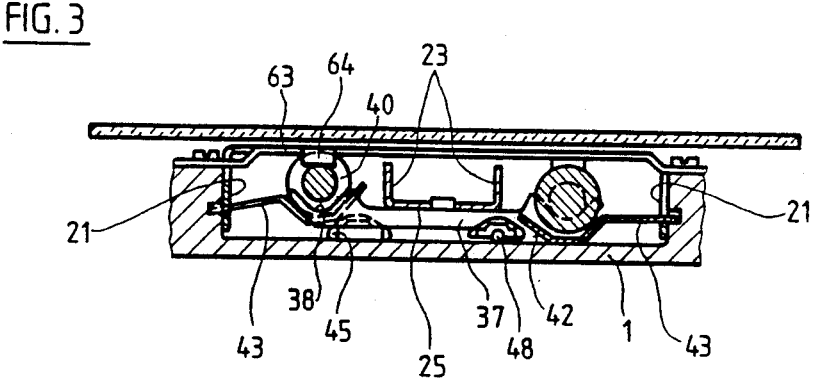
FIG. 3 section through the operating arrangement line III—III in FIG. 2.

The execution of an adjustment of the scale is accomplished as follows: the two reference weights 39, 41 initially lie in the lifting trays 43 which are held by the gliding shoes 45 in the highest position, preferably forcing the reference weights 39, 41 against the upper cover 63 (Fig. 3, left hand side). The scale pan 29 and therefore the weighing system consequently is without load and the reference weights 39, 41 are immovably wedged by the gliding shoes 45.

As a result of a turn of the two cam discs 55, 57 one of the lifting trays 43 is lowered by pulling back the gliding shoe 45 and the reference weight 39 is placed onto the reference weight carrier 37 (FIG. 3, right hand side). The second reference weight 41 remains in the wedged position. After the weighing of the first reference weight 39 has been accomplished the cam discs 55, 57 continue to turn and the weight 39 is again lifted off. At the same time the weight 41 is put on as a result of lowering of the lifting tray 43. After the weighing of weight 41 has been accomplished the first weight 39 is also placed onto the reference weight carrier 37 as a result of a further turn of the cam discs 55, 57. In the case of the last weighing, the total weight of the two weights 39, 41 is determined. In the next turn of the cam discs the gliding shoes are moved beneath their respective lifting trays 43 and both reference weights 39, 41 are lifted off again. The scale is again in the unloaded starting state and the reference weights 39, 41 are immovable and securely wedged against the cover.

The prescribed rotary paths of the cam discs 55, 57 are carried out by a motor which is in active connection on the cam shaft 61 by the way of a pinion, or is seated directly on the cam shaft 61. As a motor, one may use a step motor or a step switching arrangement operated manually.

The sliding underneath of the gliding shoes 45 below the lifting trays 43 is accomplished by swinging out the levers 47, 49 by means of the cam discs 55, 57. The pulling back of the gliding shoes 45 is accomplished by the pulling force of the spring 59 which is increased when the cam discs force the levers apart.

I claim:

1. An apparatus for depositing and lifting a reference weight in a precision scale having a scale base, lateral walls and a weighing mechanism comprising:
   (a) at least one cam disc fixed on a rotatable, vertical cam shaft; and
   (b) at least one lever, having a free end and a cam following portion opposite the free end, rotatable about a vertical shaft and cooperating with the cam disc, said free end movable, in response to rotation of said cam disc, between a first position for holding said reference weight in a disengaged position and a second position for depositing said reference weight.

2. The apparatus of claim 1 further comprising:
   (a) a lifting tray having a bottom side which forms a slanted glide surface located immediately below the reference weight and above the free end of the lever; and
   (b) a horizontal hinge providing a hinged connection between the lifting tray and the lateral wall whereby the free end of the lever acts against the slanted glide surface to lift the reference weight in the lifting tray by pivoting about the vertical shaft.

3. The apparatus of claim 2 wherein a wedge-shaped glide shoe is attached to the free end of the lever and slides freely on the scale base to act against the slanted glide surface of the lifting tray thereby reducing friction and allowing smoother operation of the apparatus.

4. The apparatus of claim 2 or 3 wherein a roller is located under the free end of the lever to reduce friction with the scale base and permit free movement of the lever.

5. The apparatus according to any one of claims 1 to 3 including:
   (a) two levers disposed one above the other and crossing one another;
   (b) two cam discs fixed on the cam shaft and shaped such that each cam disc is always in contact with one lever; and
   (c) two reference weights, each movable by one of the levers.

6. The apparatus of claim 4 including:
   (a) two levers disposed one above the other and crossing one another;
   (b) two cam discs fixed on the cam shaft and shaped such that each cam disc is always in contact with one lever; and
   (c) two reference weights, each movable by one of the levers.

7. The apparatus of claim 5 wherein each lever rides on an opposite side of the cam shaft and a spring connects the two levers and urges them in constant contact with the cam discs.

8. The apparatus of claim 6 wherein each lever rides on an opposite side of the cam shaft and a spring connects the two levers and urges them in constant contact with the cam discs.

9. The apparatus of claim 2 wherein:
   (a) the reference weight has two circumferential recesses; and (b) the weighing mechanism has connected to it reference weight carriers, disposed below the reference weight recesses for carrying the reference weight when determining a correcting factor.

10. The apparatus of claim 9, wherein each reference weight carrier has a notch into which the associated recess of the reference weight will fit, positioned such that the reference weight carrier extends only slightly beyond the reference weight when the reference weight is deposited on the carrier in order to determine a correcting factor.

* * * * *